Sept. 26, 1939.  W. S. KNIGHT ET AL  2,174,467
NONRHYTHMIC THREAD CUTTING DIE AND METHOD OF PRODUCING NONSINUOUS THREADS
Filed July 30, 1936
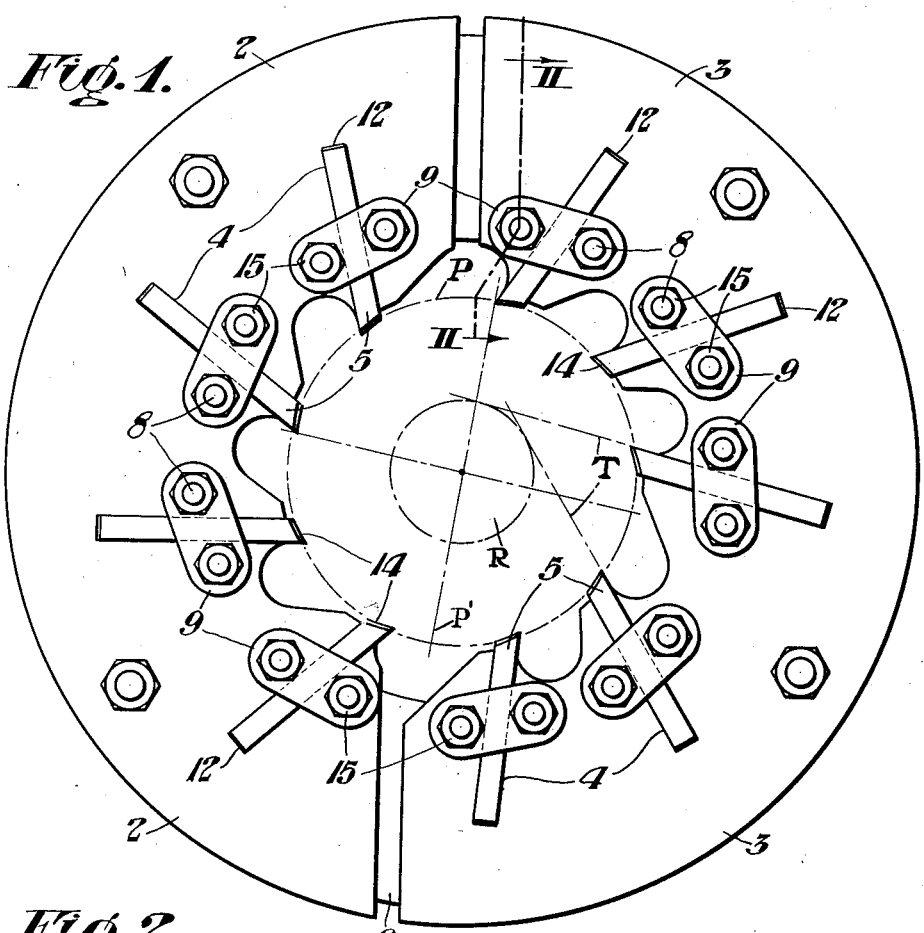
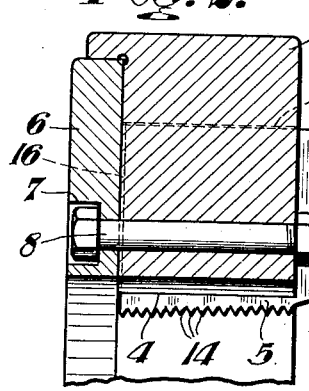
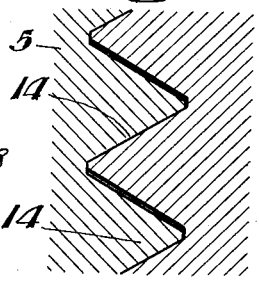
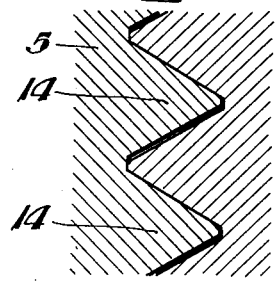
Inventors:
WALTER S. KNIGHT and
SAMUEL WEBB.
by: Usina & Rauber
their Attorneys.

Patented Sept. 26, 1939

2,174,467

UNITED STATES PATENT OFFICE 2,174,467

NONRHYTHMIC THREAD CUTTING DIE AND METHOD OF PRODUCING NONSINUOUS THREADS

Walter S. Knight, Dravosburg, and Samuel Webb, Pittsburgh, Pa., assignors to National Tube Company, a corporation of New Jersey Application July 30, 1936, Serial No. 93,474

9 Claims. (Cl. 10—121)

This invention relates to a non-rhythmic die and a method of threading pipes, bars or like material.

An object of the invention resides in steadying the material as it is being threaded to produce a non-sinuous threaded area.

Other objects and advantages of this invention will become apparent as the description proceeds, in which:

Figure 1 is an elevational view of the die ring and chaser assembly;

Figure 2 is a section on line II—II of Figure 1;

Figure 3 is a detailed section showing teeth of certain chasers cutting on the front flank; and Figure 4 is a detailed section showing the teeth of alternate chasers cutting on the back flank with the clearance between the cutting teeth and the material being threaded.

In the art of producing screw threads heretofore, it has been the practice to space the chasers at equal angles around the periphery of the die ring or holder. In cutting threads on pipes or bars with dies involving the use of such type of chasers, considerable difficulty is encountered in eliminating chatter, sinuosity with reference to the axis of the pipe or bar and sinuosity with reference to the flank of the thread being cut. We have discovered that these, as well as other classes of defective threads, are caused by the rhythmic action of the chasers which are spaced at equal angles about the axis of the pipe or bar to be threaded.

Chatter and waves in threads are directly traceable to vibration of the work in the die which is induced by the actions of the cutting chasers on the work. If these chasers are equally spaced angularly about the axis of the work, the period of vibration assumes the rhythmic pitch of the chaser spacing, resulting in the wave-like defect in the thread.

When the cutting edge of the first chaser to contact the work does so, it tends to deflect the work away from the contact point and upon passing the contact point, the work tends to assume its normal position. The work reacts with the next chaser in the series to contact with it in the same way and so on until completion of the revolution at which time the work is vibrating minutely at a frequency determined by the number of chasers and the thread assumes the wavy form hereinbefore described. This wavy condition continues throughout the entire screw threading operation.

In the present invention, the formation of sine-like waves on the threads is eliminated by arranging an odd number of chasers or cutting members about the periphery of the pipe at unequal angles so that the die member, due to the odd number of chasers, acts as a steady rest for the pipe being threaded and no rhythmic action can develop during the thread cutting operation.

In the drawing, the numerals 2 and 3 represent segments of a split die ring provided with one or more chaser slots 4, spaced at unequal angular distances about said die ring. The angular position of the slots 4 is such that when the cutting chasers 5 are positioned therein they are tangential with respect to the periphery of the rake circle R, as diagrammatically indicated by the lines T. This rake circle is the method used for determining the cutting angle of the chasers. A desirable arrangement of the chasers is one where a line drawn from the point of contact of any chaser and the pipe circumference P, through the pipe center to the opposite wall of the pipe, will intersect the opposite wall of the pipe at a point substantially midway between the contact points of two adjacent chasers, as diagrammatically indicated by the line P'. One of the characteristic features permitting the cutting of true, non-sinuous threads is the odd number of chasers disposed at unequal distances about the periphery of the die ring and tangentially disposed with respect to the rake circle of the pipe. This relationship of the odd number of chasers being unequally spaced about the periphery of the die ring and the pipe to be threaded, steadies the work during its threading operation and eliminates the usual vibration of the work as it is being threaded.

A bottom plate 6, serving as a seat for the chasers in the segmental die ring, is recessed at 7 and fastened to the die members by bolts 8 which also function to secure clamp 9 in position on the chasers 5. The chasers are mounted in the die ring or holder in such a manner that radial adjustment may be made by inserting shims 12 between the base of the slot 4 and the end of the chasers. It is also possible to adjust, remove or replace any individual chaser 5 without disturbing the setting or alignment of the other chasers of the same set.

Each chaser is provided with a plurality of thread cutting teeth 14. It is desirable that only one flank of the teeth of each chaser shall function to remove metal from the material and in order to accomplish this purpose, the chasers are adjusted so that every other chaser will cut on the front flank of each tooth, and the alternate chasers will cut on the back flank of each tooth.

In carrying out such a procedure, there is provided a clearance between the inactive flank and the material, which permits the metal which is cut from the active or metal engaging flank of the chaser to escape freely as there is no interference from any chips from the opposite or inactive flank which is present when both flanks of the thread cutting teeth are engaging the material simultaneously.

Such adjustment may be obtained by introducing a thin shim 16 of metal of known thickness between the chaser and bottom plate 6 in alternate chaser slots 4. This changes the trackage of the chaser teeth upon the surface of the material to be threaded and controls the cutting action of the teeth and the efficiency of the die. Another way of making the adjustment and a more desirable method, involves grinding the bottom of every other chaser a predetermined amount which will also change the trackage of the chaser teeth so ground, and provide the same cutting control as that before mentioned.

By loosening the bolts 8, which are disposed at each side of the chasers 5, when the die is closed and the pipe is rotating, said chasers will adjust themselves evenly around the periphery of the work and the pressure of the die ring upon the material will be equally and uniformly distributed among the chasers 5. When the operator desires to increase or decrease the amount of metal removed by each flank of the cutting teeth 14, he alters the cutting action of the flanks of the cutting teeth by varying the pressure of the clamp 9 on the chasers 5 which is accomplished by tightening or loosening the nuts 15 on the bolt 8.

It is, therefore, apparent from the present invention, that it is possible to prevent the formation of sine-like waves on the threads by arranging the odd number of chasers or cutters about the periphery of the pipe spaced at unequal angles, so that no rhythmic action may develop.

By arranging the cutting spacers as hereinbefore described, there is provided a die ring which acts as a steady rest for the work being threaded and by providing an odd number of chasers, as shown in the drawing, it is impossible to have any vibration of the work due to such an arrangement of chasers about the periphery of the work which will result in producing threaded areas wherein the threads are uniform throughout and are non-sinuous.

While we have shown and described one specific embodiment of the invention, it will be understood that we do no wish to be limited exactly thereto, since various modifications may be made without departing from the scope of the invention as defined by the following claims.

We claim:

1. A pipe threading die including a plurality of threading chasers spaced at unequal angular distances about the periphery of said die, the alternate chasers having a predetermined amount of metal removed from the bottom thereof, so that every other chaser will form one side of the thread and the alternate chasers will form the other side of the thread.

2. A pipe threading die including a plurality of threading chasers spaced at unequal angular distances about the periphery of said die, and shims positioned between some of the chasers and said die to change the trackage of the chaser teeth upon the surface of the pipe so that every other chaser will form one side of the thread and the alternate chasers will form the other side of the thread.

3. In a pipe threading die head, means for steadying the tubular work in said die head to produce a threaded area having non-sinuous threads, said means comprising chasers spaced at unequal angular distances about the periphery of said tubular work being threaded.

4. In a pipe threading die, a plurality of threading chasers spaced at unequal distances about the periphery of said die, the angular relation of the cutting chasers to the circumference of the work being threaded being such that a line drawn from the point of contact of any chaser through the center of the work being threaded will intersect the opposite wall of said work at a point substantially midway between the contact points of two adjacent chasers.

5. A pipe threading die comprising a segmental body member and a plurality of threading chasers spaced at unequal angular distances about the periphery of said segmental body member.

6. A pipe threading die including a plurality of threading chasers spaced at unequal angular distances about the periphery of said die and means for varying the contact of the cutting edges of the individual chasers with the pipe being threaded whereby one side of the pipe thread is formed by some of said chasers and the other side of the pipe thread is formed by the alternate chasers.

7. A pipe threading die including a die ring, an odd number of unequally spaced slots in said die ring, thread cutting chasers positioned in said slots, means for independently adjusting said chasers radially and means for adjusting or replacing any individual chaser without disturbing the adjustment of the remaining chasers to produce a surface having non-sinuous threads.

8. A pipe threading die including a plurality of threading chasers spaced at unequal angular distances about the periphery of said die and means for shifting the chasers longitudinally of the axis of the pipe so that only one of the two cutting edges of the chaser teeth contacts the pipe whereby one side of the pipe thread is formed by some of said chasers and the other side of the pipe thread is formed by the alternate chasers.

9. A die for cutting threads which have even peripheral and longitudinal edge surfaces on a tubular article comprising a die ring, a plurality of unequally spaced chaser seats in said die ring, thread cutting chasers having a plurality of cutting teeth disposed in said seats, said chasers being relatively positioned in said die ring so that successive chasers cut on alternate flanks of said cutting teeth whereby one side of the thread on the tubular object is formed by some of said chasers and the other side of the thread is formed by the alternate chasers.

WALTER S. KNIGHT.
SAMUEL WEBB.